United States Patent [19]

Takase et al.

[11] Patent Number: 4,930,881
[45] Date of Patent: Jun. 5, 1990

[54] IMAGE PICKUP OPTICAL SYSTEM

[75] Inventors: Hiroshi Takase, Hachiouji; Hisashi Goto, Akishima; Takashi Inoue, Hachiouji; Hidenori Sakurai, Hachiouji; Akiteru Kimura, Hachiouji, all of Japan

[73] Assignee: Olympus Optical Co., Ltd., Tokyo, Japan

[21] Appl. No.: 272,420

[22] Filed: Nov. 17, 1988

[30] Foreign Application Priority Data

Nov. 19, 1987 [JP] Japan .................................. 62-290584

[51] Int. Cl.$^5$ ........................ G02B 17/00; G02B 5/08; G02B 27/18
[52] U.S. Cl. .................................. 350/445; 350/600; 350/642; 350/276 R
[58] Field of Search ............... 350/445, 600, 642, 629, 350/625, 618, 276 R, 277, 278

[56] References Cited

U.S. PATENT DOCUMENTS

| | | | |
|---|---|---|---|
| 1,437,850 | 12/1922 | Hodny | 350/600 |
| 4,129,671 | 12/1978 | Greenberg | 350/600 |
| 4,630,905 | 12/1986 | Blow | 350/642 |

FOREIGN PATENT DOCUMENTS

| | | | |
|---|---|---|---|
| 225160 | 3/1958 | Australia | 350/600 |
| 2725952 | 12/1978 | German Democratic Rep. | 350/629 |
| 45-36540 | 11/1970 | Japan | 350/600 |
| 2092534 | 8/1982 | United Kingdom | 350/629 |

Primary Examiner—Jon W. Henry
Attorney, Agent, or Firm—Cushman, Darby & Cushman

[57] ABSTRACT

The reflecting mirror for leading the image forming light bundle emitted from an image pickup optical system to an image forming surface has an area for reflecting the effective image forming light bundle, and another marginal area which is located outside said area, and has a reflecting characteristic different from that of said area and varying gradually outward. Accordingly, the reflecting mirror is capable of blurring the boundary of the veiling glare and reducing appearance of detrimental images. The variation of the reflecting characteristic on said outside marginal area can be realized by varying reflectance or light diffusing characteristic of the outside marginal area.

12 Claims, 4 Drawing Sheets

IMAGE PICKUP OPTICAL SYSTEM

BACKGROUND OF THE INVENTION (a) Field of the Invention

The present invention relates to a reflecting mirror to be used in image pickup systems of photographic cameras, electronic still cameras and so on.

(b) Field of the Invention

As one of the optical systems to be used in instant cameras and half-size cameras, there is already known the optical system, for example, shown in FIG. 1 wherein a first reflecting mirror 2 and a second reflecting mirror 3 are arranged in the vicinity of an image forming surface 4 for leading a light bundle from an imaging lens 1 to the image forming surface 4. In such an optical system, the second reflecting mirror 3 is so designed as to have a surface size just required for reflecting an effective light bundle or a surface size larger than the diameter of the effective light bundle with unnecessary marginal area shielded by a black paint or by a portion of a fixing frame as shown in FIG. 2A. Accordingly, when a portion of the light diffusedly reflected from an image of an object formed on the image forming surface 4 due to the diffusing property of the image forming surface 4 is incident, as the veiling glare, again on the image forming surface 4 from the reflecting mirror 3, the veiling glare 5 is partitioned on the image forming surface 4 along a boundary 5a corresponding to the outer circumference of the above-mentioned shielding member or the reflecting mirror 3 as shown in FIG. 2B. Since the human eyes have a high capability to detect such a boundary due to the visual characteristic inherent therein, the partition is distinguishable enough to make unappreciated the pictures photographed with such an optical system even when intensity of light sources is not so high and the above-mentioned veiling glare is no so remarkable.

SUMMARY OF THE INVENTION

In view of the problem described above, it is a primary object of the present invention to provide a reflecting mirror so adapted as to make the boundary of the veiling glare hardly distinguishable by the human eyes.

The reflecting mirror according to the present invention has a reflecting surface larger than the size required for reflecting an effective light bundle and a reflecting characteristic which is gradually varied outward from the reflecting surface area for reflecting the effective light bundle. Accordingly, the light bundle reflected on said area and the marginal area located outside thereof has, when incident on an image forming surface, an intensity of illumination gradually varying on the image forming surface as viewed by the human eyes. Speaking more concretely, when the area 3b which has conventionally been shielded by a frame is so treated as to have a reflecting characteristic gradually varying as shown in FIG. 3A, the light bundle reflected on the area 3b has an intensity distribution of illumination gradually varying, upon incidence on the image forming surface 4, as viewed by the human eyes and the conventional boundary disappears or is changed into a gradually darkened area 5b, whereby the optical system can form a desirable image.

In a preferred formation of the present invention, reflectance of said outside marginal area is varied stepwise or continuously outward.

In another preferred formation of the present invention, a plural number of sections having reflectance different from one another among the neighboring sections are arranged on said outside marginal area and ratios of the areas are different from one another among neighboring sections.

In still another preferred formation of the present invention, light diffusing characteristic of said outside marginal area is gradually varied outward.

In still another preferred formation of the present invention, said outside marginal area is curved.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

Now, the present invention will be detailedly described with reference to the preferred embodiments shown in the accompanying drawings.

Figure 1:
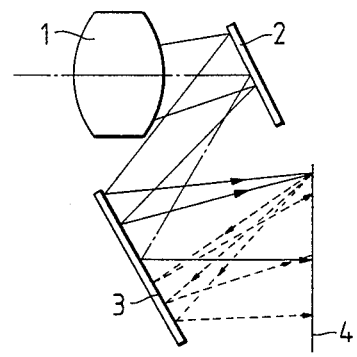
FIG. 1 is a sectional view illustrating the formation of the conventional image pickup system using reflecting mirrors.
Figure 2A:
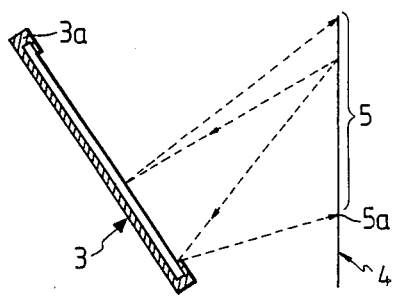
FIG. 2A and FIG. 2B are diagrams illustrating the formation of the reflecting mirror and manner of the areas which are affected and not affected by the veiling glare on the image forming surface in the conventional example shown in FIG. 1.
Figure 2B:
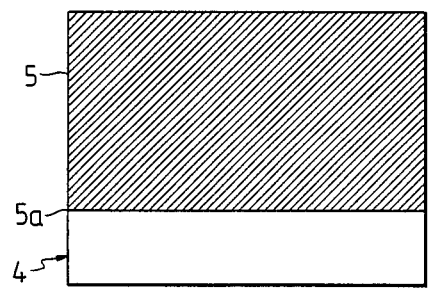
Figure 3A:
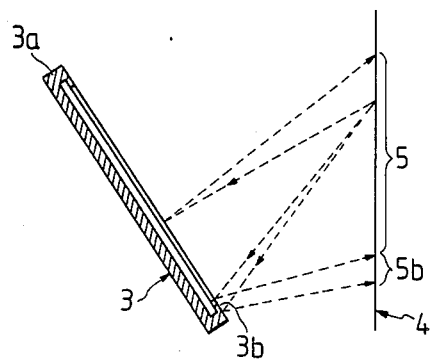
FIG. 3A and FIG. 3B are diagrams illustrating a fundamental formation of the reflecting mirror according to the present invention and the manner of the areas which are affected and not affected by the veiling glare on an image forming surface in said formation.
Figure 3B:
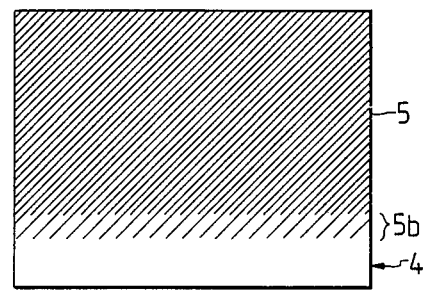
Figure 4A:
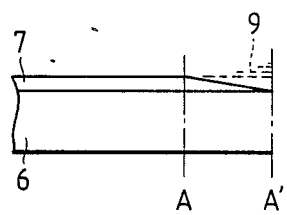
FIG. 4A, FIG. 4B and FIG. 4C are diagrams illustrating a section of the main member, reflectance characteristic and a modification example, of Embodiment 1 of the present invention.
Figure 4B:
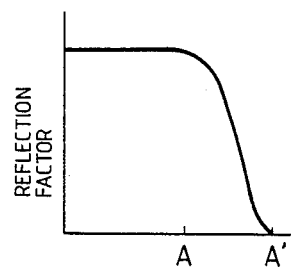
Figure 4C:
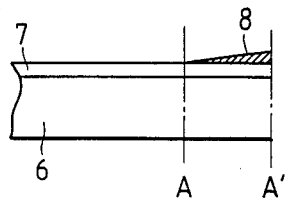

FIG. 4 shows the Embodiment 1 of the present invention wherein reflectance is continuously varied as shown in FIG. 4B by continuously varying thickness fo reflecting layer 7 coated on a base plate 6 at the outside marginal area (the area located outside the area for reflecting the effective image forming light bundle). The similar effect can be obtained by continuously varying thickness of a light-shielding coating 8 formed on the reflecting layer 7 at the outside marginal area of the reflecting mirror as shown in FIG. 4C. Further, an equivalent effect is obtainable by varying reflectance stepwise so far as each step has an adequate narrow width. Such variation of reflectance can be realized by forming multilayer dielectric films on the reflecting layer 7 at the marginal area located outside the effective area and increasing the number of the layers stepwise as shown in the dashed lines in FIG. 4A or varying formation of the films.

Figure 5A:
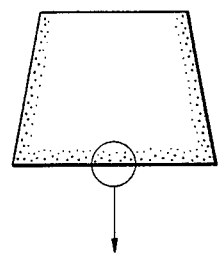
FIG. 5A, FIG. 5B and FIG. 5C are diagrams illustrating a front view of the main member, a sectional view of the main member and sectional view of a modification example of the main member in Embodiment 2 of the present invention.
Figure 5A:
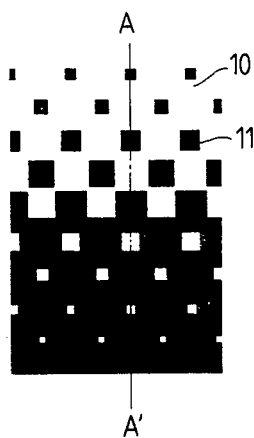

FIG. 5A illustrates the Embodiment 2 of the present invention which is an example wherein reflectance characteristic, as viewed by the human eyes, is varied by using patterns consisting of high reflectance sections 10 and low reflectance sections 11 formed on the outside marginal area of the reflecting mirror. In this example, reflectance of the high reflectance sections can be the same as that of the area for reflecting the effective light bundle. The sections are arranged regularly in this embodiment, but they may be distributed at random.

Figure 5B:
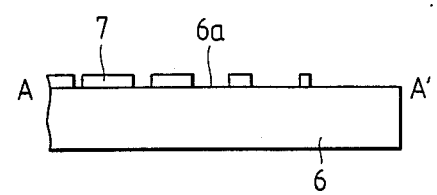
Figure 5C:
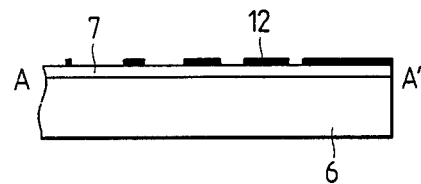

Further, when natural scenes are to be used as backgrounds, an effect more favorable for the human eyes will be obtained by utilizing patterns similar to the backgrounds or patterns of fractal dimensions close to those of the backgrounds. As for a method to form the patterns, the high reflectance sections can be formed as the reflecting layer 7 and the low reflectance sections as the surface 6a of the base plate 6 as shown in FIG. 5B. In this case, it can be practised to coat the entire surface of the base plate 6 with the reflecting layer and then remove the reflecting layer 7 by etching or the similar process from the areas corresponding to the low reflectance sections. Alternately, it is possible to carry out the mirror coating with a pattern mask having apertures corresponding to the high reflectance sections placed over the base plate 6. Furthermore, it is possible to form the high reflectance sections as the reflecting layer 7 and the low reflectance sections with a light-shielding paint 12. The light-shielding paint 12 can be coated by printing, spraying, etc.

Figure 6A:
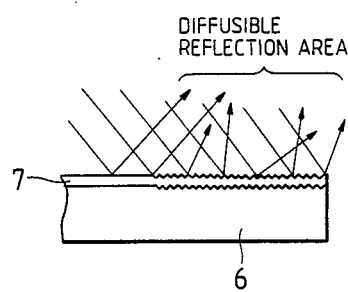
FIG. 6A and FIG. 6B are sectional views of the main member and a modification example of the main member in Embodiment 3 of the present invention.
Figure 6B:
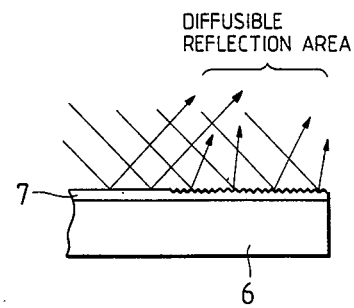

FIG. 6A and FIG. 6B show the Embodiment 3 of the present invention wherein diffusing characteristic of the outside marginal area of the reflecting mirror is gradually varied outward. The reflecting mirror shown in FIG. 6A has a light diffusing characteristic, at the outside marginal area, which is imparted by machining, for example, sandblasting or etching the area corresponding to the marginal area located out-side the area for reflecting the effective light bundle so as to have slight irregularities and coating the outside marginal area with a reflecting layer. Further, the reflecting mirror shown in FIG. 6B is covered with the reflecting layer 7 having a diffusing characteristic which is obtainable by chemical corrosion.

Figure 7:
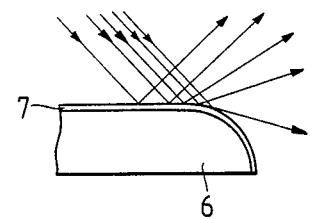
FIG. 7 is a sectional view of the main member in Embodiment 4 of the present invention.

FIG. 7 illustrates the Embodiment 4 of the present invention wherein the outside marginal area of the reflecting mirror is formed in the shape of a curved surface so that density of the light bundle is gradually lowered by diverging the reflected light bundle. Such a curved surface can easily be formed by the conventional machining technique such as grinding or molding.

Now, description will be made on an image pickup system using the reflecting mirror according to the present invention.

Figure 8A:
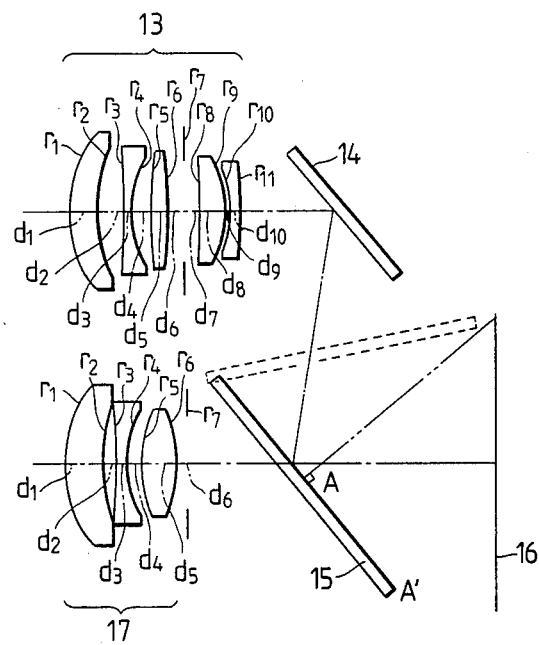
FIG. 8A and FIG. 8B are a compositional diagram of an image pickup system using the reflecting mirror according to the present invention and a front view of the reflecting mirror.
Figure 8B:
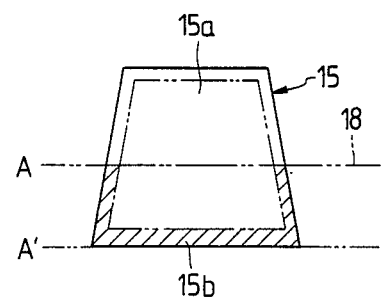

FIG. 8A and FIG. 8B show a formation of the image pickup system wherein the reflecting characteristic shown in FIG. 8B is imparted to a second reflecting mirror 15 in an optical system designed in such a manner that the image forming light bundle from a first imaging lens 13 is led to an image forming surface 16 by using a first reflecting mirror 14 and a second reflecting mirror 15 is arranged after the first imaging lens 13 and the second reflecting mirror 15 is brought back to the position indicated in the dashed lines in FIG. 8A for leading the image forming light bundle from a second imaging lens 17 to the image forming surface 16. In this case, out of the rays reflected by the image forming surface 16, the ray reflected by the area above the perpendicular traced from the top side of the image forming surface 16 to the second reflecting mirror 15 cannot fall again on the image forming surface 16. Speaking concretely with reference to FIG. 8B, the reference numeral 18 represents the perpendicular traced from the top side of the image forming surface 16 to the second reflecting mirror 15 to determine the limit of the veiling glare to be produced, the reference numeral 15a designates an effective area for reflecting the image forming light bundle and the reference numeral 15b denotes the area absolutly requiring a measure for obtaining the reflecting characteristic described above. In addition, the first imaging lens 13 has a focal length longer than that of the second imaging lens 17.

| (The first imaging lens) $f = 67.6 \quad F\ No. = 6.5 \quad 2\omega = 35.4°$ | | | |
|---|---|---|---|
| $r_1 = 10.1957$ | | | |
| | $d_1 = 2.6094$ | $n_1 = 1.69680$ | $\nu_1 = 56.49$ |
| $r_2 = 20.2340$ | | | |
| | $d_2 = 1.9560$ | | |
| $r_3 = -60.1027$ | | | |
| | $d_3 = 0.8004$ | $n_2 = 1.68893$ | $\nu_2 = 31.08$ |
| $r_4 = 10.6998$ | | | |
| | $d_4 = 1.2738$ | | |
| $r_5 = 20.1357$ | | | |
| | $d_5 = 1.8096$ | $n_3 = 1.74400$ | $\nu_3 = 44.73$ |
| $r_6 = -30.9758$ | | | |
| | $d_6 = 1.2150$ | | |
| $r_7 = $ Stop | | | |
| | $d_7 = 1.3200$ | | |
| $r_8 = -118.2237$ | | | |
| | $d_8 = 2.0871$ | $n_4 = 1.59270$ | $\nu_4 = 35.29$ |
| $r_9 = -11.0779$ | | | |
| | $d_9 = 0.5827$ | | |
| $r_{10} = -10.5142$ | | | |
| | $d_{10} = 0.8024$ | $n_5 = 1.78800$ | $\nu_5 = 47.38$ |
| $r_{11} = -119.2017$ | | | |
| (The second imaging lens) $f = 35.7 \quad F\ No. = 3.64 \quad 2\omega = 62.3°$ | | | |
| $r_1 = 10.3331$ | | | |
| | $d_1 = 3.3746$ | $n_1 = 1.83481$ | $\nu_1 = 42.72$ |
| $r_2 = 19.8873$ | | | |
| | $d_2 = 1.0400$ | | |
| $r_3 = -43.6904$ | | | |
| | $d_3 = 0.8000$ | $n_2 = 1.58370$ | $\nu_2 = 35.29$ |
| $r_4 = 8.7385$(Aspherical surface) | | | |
| | $d_4 = 1.4770$ | | |
| $r_5 = 16.7492$ | | | |
| | $d_5 = 2.7000$ | $n_3 = 1.49216$ | $\nu_3 = 57.50$ |
| $r_6 = -17.7110$ | | | |
| | $d_6 = 1.0400$ | | |
| $r_7 = $ Stop | | | |

| Numerical data of the aspherical surface |
|---|
| $P = 1.0000, E = -0.87526 \times 10^{-5},$ |
| $F = -0.17594 \times 10^{-5}, G = 0.92478 \times 10^{-7},$ |
| $H = -0.28880 \times 10^{-8}$ |

Wherein the reference symbols $r_1$ through $r_{11}$ represent radii of curvature on the surfaces of the respective lens elements, the reference symbols $d_1$ through $d_{10}$ represent thicknesses of the respective lens elements and airspaces reserved therebetween, the reference symbols $n_1$ through $n_5$ represent refractive indices of the respective lens elements, the reference symbols $\nu_1$ through $\nu_5$ represent Abbe's numbers of the respective lens elements, the reference symbol f represents focal length of the imaging lens as a whole, the reference symbol FNo. represents F-number, the reference symbol $2\omega$ represents angle of view, the reference symbol P represents conic constant and the reference symbols E, F, G and H represent aspherical coefficients.

Further, the aspherical surface $\Delta x$ is expressed by the following formula when the optical axis of the imaging lens is determined as X-axis, a point which the aspherical surface intersects the X-axis is determined as an origin, and a perpendicular line from the origin to the X-axis is determined as $\rho$-axis.

$$\Delta x = \frac{\rho^2/r}{1 + \sqrt{1 - P(\rho/r)^2}} + E\rho^4 + F\rho^6 + G\rho^8 + H\rho^{10}$$

wherein the reference symbol r represents radius of curvature on a spherical surface which touches the aspherical surface at an apex thereof.

As is understood from foregoing description, the reflecting mirror according to the present invention is capable of reducing appearance of deterimental image by blurring the boundary of the veiling glare.

What is claimed is:

1. An image pickup optical system comprising a first imaging lens and a second imaging lens arranged so as to set the optical axes thereof in substantially parallel to each other and having focal lengths different from each other, an image forming surface disposed on the optical axis of said second imaging lens, a second reflecting mirror removably arranged in the optical path of said second imaging lens at a location between said second imaging lens and the image forming surface, and a first reflecting mirror arranged on the optical axis of said first imaging lens and having a function to reflect the incident light to said second reflecting mirror, said second reflecting mirror having a reflecting surface whose area is larger than the cross-sectional area of the light bundle made incident thereon by way of said first reflecting mirror, and reflectance being varied so as to be lowered outward on at least a portion of the marginal area located outside the effective reflecting area of said second reflecting mirror.

2. An image pickup optical system comprising a first imaging lens and a second imaging lens arranged so as to set the optical axes thereof in parallel to each other and having focal lengths different from each other, an image forming surface disposed on the optical axis of said second imaging lens, a second reflecting mirror removably arranged in the optical path of said second imaging lens at a location between said second imaging lens and the image forming surface, and a first reflecting mirror arranged on the optical axis and having a function to reflect the incident light to said second reflecting mirror, said second reflecting mirror having a reflecting surface whose area is larger than the cross-sectional area of the light bundle made incident thereon by way of said first reflecting mirror, a plural number of sections having reflectance values and ratios of areas different from one another among the neighboring sectons being formed on at least a portion of the marginal area located outside the effective reflecting area of said second reflecting mirror, and the area of each of said sections having low reflectance becoming larger than the area of each of said sections having high reflectance in the outward direction.

3. An image pickup optical system comprising a first imaging lens and a second imaging lens arranged so as to set the optical axes thereof in parallel to each other and having focal lengths different from each other, an image forming surface disposed on the optical axis of said second imaging lens, a second reflecting mirror removably arranged in the optical path of said second imaging lens at a location between said second imaging lens and the image forming surface, and a first reflecting mirror arranged on the optical axis of said first imaging lens and having a function to reflect the incident light to said second reflecting mirror, said second reflecting mirror having a reflecting surface whose area is larger than the cross-sectional area of the light bundle made incident thereon by way of said first reflecting mirror, and light diffusing characteristic being varied gradually outward on at least a portion of the marginal area located outside the effective reflecting area of said second reflecting mirror.

4. An image pickup optical system comprising a first imaging lens and a second imaging lens arranged so as to set the optical axes thereof in substantially parallel to each other and having focal lengths different from each other, an image forming surface disposed on the optical axis of said second imaging lens, a second reflecting mirror removably arranged in the optical path of said second imaging lens at a location between said second imaging lens and the image forming surface, and a first reflecting mirror arranged on the optical axis of said first imaging lens and having a function to reflect the incident light to said second reflecting mirror, said second reflecting mirror having a reflecting surface whose area is larger than the cross-sectional area of the light bundle made incident thereon by way of said first reflecting mirror, and at least a portion of the marginal area located outside the effective reflecting area of said second reflecting mirror being curved.

5. An image pickup optical system conducting a beam of light coming from on object to be photographed to an image forming surface, comprising:
   an object lens; and
   a reflecting mirror for receiving imaging light from said object lens, said reflecting mirror having a reflecting surface including an effective area and a marginal area whose reflecting characteristic varies progressively in going from said effective area outward.

6. A image pickup optical system according to claim 5 wherein reflectance is varied stepwise on said marginal area.

7. An image pickup optical system according to claim 5 wherein reflectance is continuously varied on said marginal area.

8. An image pickup optical system according to claim 6 or 7 wherein reflectance is varied so as to be lowered outward.

9. An image pickup optical system according to claim 5 wherein a plural number of sections having reflectance values different from one another among the neighboring sections are arranged on said marginal area and ratios of area are different from one another among the neighboring sections.

10. An image pickup optical system according to claim 9 wherein area of each of the sections having low reflectance becomes larger than that of each of the sections having high reflectance in the outward directions.

11. An image pickup optical system according to claim 5 wherein light diffusing characteristic of said marginal area is gradually varied outward.

12. An image pickup optical system according to claim 5 wherein said marginal area is curved.

* * * * *